US009047265B2

(12) United States Patent
Hagisawa et al.

(10) Patent No.: US 9,047,265 B2
(45) Date of Patent: Jun. 2, 2015

(54) DEVICE, METHOD, AND COMPUTER READABLE MEDIUM FOR CREATING FORMS

(75) Inventors: Shoichi Hagisawa, Ishikawa (JP); Go Dojo, Ishikawa (JP); Toshihiko Sugita, Ishikawa (JP); Yoshinori Kuwamura, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 378 days.

(21) Appl. No.: 13/112,858

(22) Filed: May 20, 2011

(65) Prior Publication Data

US 2011/0286023 A1    Nov. 24, 2011

(30) Foreign Application Priority Data

May 24, 2010  (JP) ................... 2010-118806

(51) Int. Cl.
*G06K 9/34* (2006.01)
*G06K 9/18* (2006.01)
*G06F 17/24* (2006.01)

(52) U.S. Cl.
CPC .......... *G06F 17/243* (2013.01); *G06K 2209/01* (2013.01)

(58) Field of Classification Search
USPC ............. 358/1.6, 3.23, 3.24, 1.11, 1.13, 1.18, 358/530, 538, 403, 453, 462, 464, 1.1, 1.2, 358/1.9, 3.21, 3.22, 3.26, 3.27, 1.14, 1.15, 358/1.17, 526, 305, 540; 382/181, 182, 382/312, 173, 175, 176, 177, 178, 179, 180, 382/209, 229, 286, 291, 292, 305, 306, 190, 382/218, 309, 321, 112, 155, 199, 254, 282, 382/298, 310, 317; 715/221, 222, 226, 223, 715/224, 225, 227, 228, 243, 244, 245, 246, 715/247, 248, 249, 250, 251, 252, 253, 272, 715/764, 765, 771, 788, 781, 792, 780
See application file for complete search history.

(56) References Cited

U.S. PATENT DOCUMENTS

| 5,228,100 | A  | * | 7/1993  | Takeda et al. ............... 382/175 |
| 5,317,646 | A  | * | 5/1994  | Sang et al. .................. 382/175 |
| 5,555,362 | A  | * | 9/1996  | Yamashita et al. ........... 715/209 |
| 6,304,272 | B1 | * | 10/2001 | Schanel et al. ............... 345/676 |
| 6,320,983 | B1 | * | 11/2001 | Matsuno et al. .............. 382/186 |
| 7,607,078 | B2 | * | 10/2009 | Geva et al. .................... 715/221 |

(Continued)

FOREIGN PATENT DOCUMENTS

| CN | 1525378   |   | 9/2004 |
| CN | 1525378   | A | 9/2004 |

(Continued)

OTHER PUBLICATIONS

Japanese Office Office Action corresponding to JP2010-118806, mailed Oct. 11, 2013 (English Translation).

(Continued)

*Primary Examiner* — Jonathan R Beckley
(74) *Attorney, Agent, or Firm* — Hogan Lovells US LLP (57) ABSTRACT

There is provided a form creation device including a retaining unit that retains a range of set information which prescribes image elements that are suitable for OCR processing and an image generation unit that generates a form image based on a user's input and the set information range retained in the retaining unit.

9 Claims, 8 Drawing Sheets

(56) References Cited

U.S. PATENT DOCUMENTS

| | | | | |
|---|---|---|---|---|
| 7,926,732 | B2* | 4/2011 | Suzuki et al. | 235/494 |
| 8,189,921 | B2* | 5/2012 | Eguchi et al. | 382/182 |
| 2001/0032185 | A1 | 10/2001 | Masaki | |
| 2008/0225340 | A1 | 9/2008 | Ohguro | |
| 2010/0008578 | A1* | 1/2010 | Eguchi et al. | 382/175 |

FOREIGN PATENT DOCUMENTS

| | | | | |
|---|---|---|---|---|
| CN | 1892642 | A | | 1/2007 |
| CN | 101266651 | A | | 9/2008 |
| EP | 451485 | A2 * | 10/1991 | ........... G06F 15/20 |
| JP | 03-240880 | A | | 10/1991 |
| JP | 07-160802 | A | | 6/1995 |
| JP | 08-023410 | A | | 1/1996 |
| JP | 08-030659 | | | 2/1996 |
| JP | 08-096044 | A | | 4/1996 |
| JP | 2000-132542 | | | 5/2000 |
| JP | 2001-159962 | A | | 6/2001 |
| JP | 2001-357126 | A | | 12/2001 |
| JP | 2006-190080 | A | | 7/2006 |
| JP | 2009-123024 | A | | 6/2009 |

OTHER PUBLICATIONS

China Patent Office, Office Action 201110136195.9 (Corresponding Application in China) mailed Mar. 26, 2013 [English Translation].
Chinese Office Action corresponding to Application No. 201110136195.9 dated Nov. 25, 2013 [English Translation].
Chinese Office Action corresponding to Chinese Application No. 201110136195.9 mailed Jun. 9, 2014. [English Translation].

* cited by examiner

DEVICE, METHOD, AND COMPUTER READABLE MEDIUM FOR CREATING FORMS

CROSS-REFERENCE TO RELATED APPLICATIONS

This application is based on and claims priority under 35 USC 119 from Japanese Patent Application No. 2010-118806 filed May 24, 2010.

BACKGROUND OF THE INVENTION

Field of the Invention

The present invention relates to a device, method, and method computer readable medium for creating forms.

SUMMARY OF THE INVENTION

According to an aspect of the invention, there is provided a form creation device including a retaining unit that retains a range of set information which prescribes image elements that are suitable for OCR processing and an image generation unit that generates a form image based on a user's input and the set information range retained in the retaining unit.

BRIEF DESCRIPTION OF THE DRAWINGS

Exemplary embodiments of the present invention will be described in detail based on the following figures, wherein.

DESCRIPTION OF THE PREFERRED EMBODIMENTS

The following will describe in detail a preferred embodiment of the present invention with reference to the accompanying drawings. It is understood that dimensions, materials, and other specific numerals given in the present embodiment are illustrative of the present invention for ease of explanation unless otherwise specified and details contained therein are not to be construed as limitations on the present invention. It is to be noted that identical reference numerals are given to the essentially the identical components in the present specification and drawings, and description thereof will not be repeated here.

(Form Processing System 100)

Figure 1:
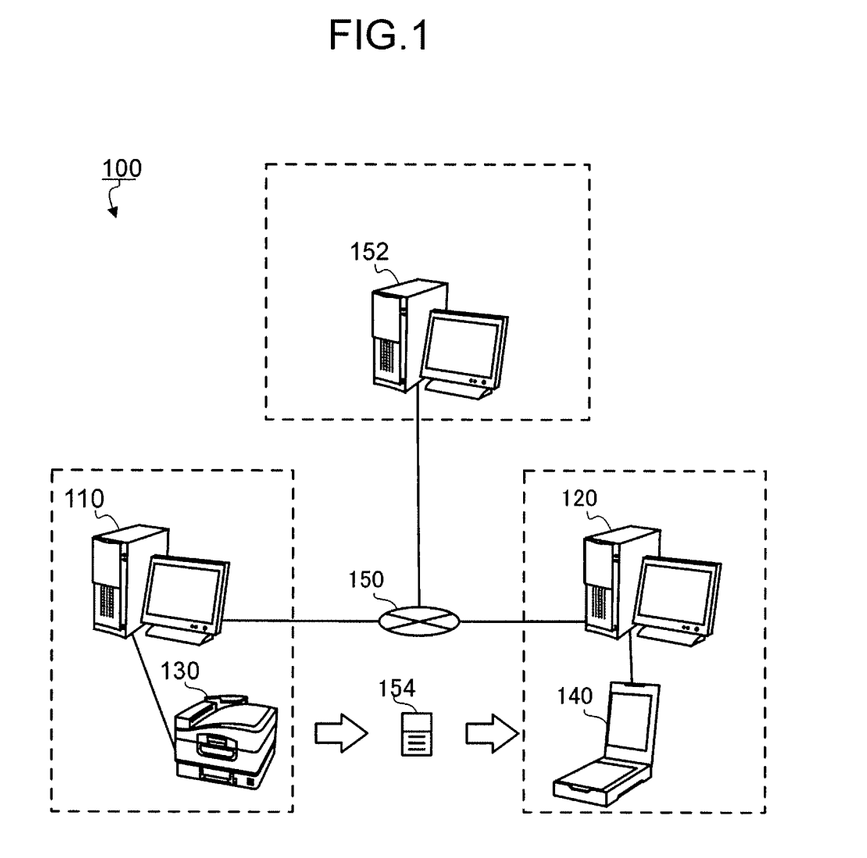
FIG. 1 is an explanatory diagram showing outlined connections in a form processing system.

FIG. 1 is an explanatory diagram showing outlined connections in the form processing system 100. The form processing system 100 includes a form creation device 110, an OCR device 120, a printer (image formation device) 130, and a scanner 140. The form creation device 110 is connected with the OCR device 120 via a communication network 150 such as the Internet, a local area network (LAN), or a dedicated line. The form creation device 110 is also connected with the printer 130 and the OCR device 120 is connected with the scanner 140 via, for example, the LAN. Further, the communication network 150 is connected with an application server 152 in a mission-critical system in a company etc.

If having received a user's input for creation of a layout, the form creation device 110 combines image elements, to create a layout image that denotes the layout of a form 154. Then, the printer 130 prints out the form 154 according to the generated layout. The user writes down, for example, job-related information onto the printed-out form 154 by handwriting, imprinting, or stamping. If the form 154 is completed in writing, the scanner 140 reads image data of the form 154 on which the information is written The read image data undergoes OCR processing in the OCR device 120, which acquires the information written on the form 154 to output to the application server 152. Consequently, the written information will be utilized in the mission-critical system.

For example, a form creation device is proposed that automatically generates a format of the form in accordance with the model of the OCR, the number of line fields, and the number of characters entered manually by the user. However, such a proposed form creation device only uniformly determines the character frame and the form size of a form to be created.

In the form processing system 100 according to the present embodiment, since the form creation device 110 generates a form image so that it may be suitable for the OCR processing, it is possible to improve accuracy in OCR processing on the generated form 154 while securing the degree of freedom of the layout. The following will describe in detail the respective configurations of the form creation device 110 and the OCR 120 in this order.

(Form Creation Device 110)

Figure 2:
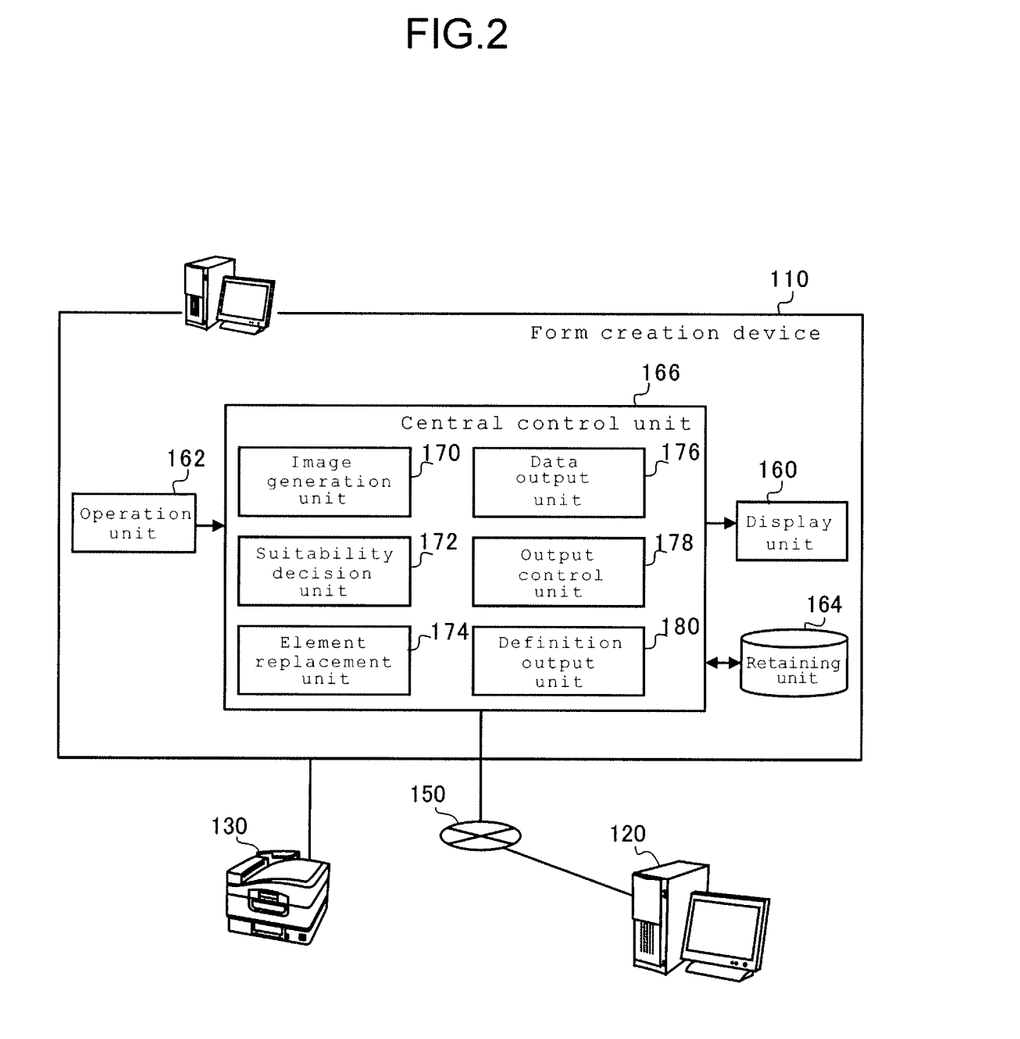
FIG. 2 is a functional block diagram showing a configuration of a form creation device.

FIG. 2 is a functional block diagram showing the configuration of the form creation device 110. The form creation device 110 includes a display unit 160, an operation unit 162, a retaining unit 164, and a central control unit 166.

The display unit 160 is constituted of an LCD, an organic electro luminescence display, etc. The operation unit 162 is constituted of a touch panel arranged on the display surface of the display unit 160, a keyboard mounted with a plurality of operation keys, a pointing device such as a mouse, an arrow key, or a joystick. The form creation device 110 displays a form creation screen on the display unit 160, to receive a user's operation input through the operation unit 162, thereby generating a layout image of the form 154 (hereinafter referred to as a form image simply).

When generating a form image, the form creation device 110 has such design modes as an ordinary mode in which no limitations are inflicted on design and an OCR form mode in which suitability to the OCR processing is take into account, which modes are switched from each other in accordance with a user's input through the operation unit 162.

Further, in the OCR form mode, basic information of the form 154 such as a color, a dropout, a scanner readout resolution, and with or without scanner correction are set in accordance with a user's input. In color setting, color display, monochromatic display, etc. can be selected. In dropout setting, it is possible to select a hard dropout form, a soft dropout form or a non-dropout form. The soft dropout form employs dropout colors not recognized by the scanner 140. A soft dropout form drops out a color selected in OCR processing in the OCR processing device 120. A non-dropout form employs a plurality of colors in a light source of the scanner 140 so that no color may be dropped out. In setting of the scanner readout resolution, the resolution of 200 dpi, 240 dpi, 300 dpi, 400 dpi, etc. can be selected. In setting of with or without scanner correction, it is possible to select whether or not to perform, for example, tilt correction on image data of the form 154 read by the scanner 140.

Figure 3:
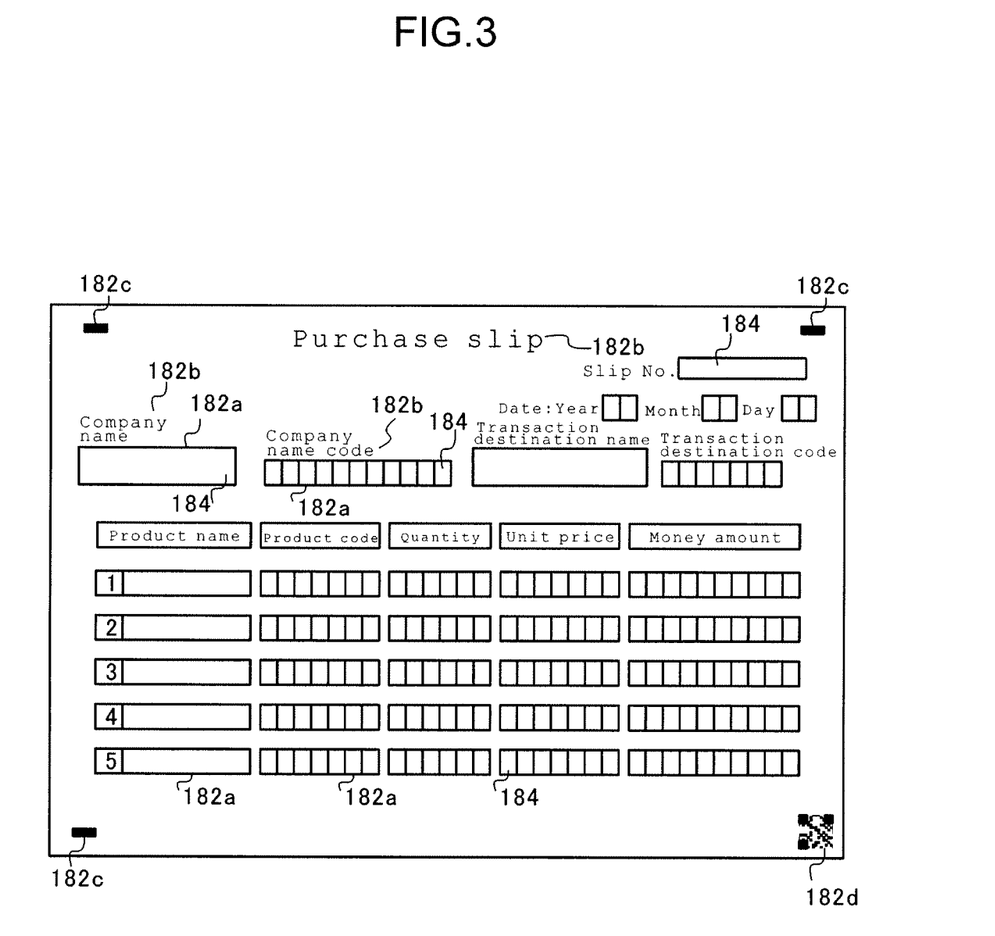
FIG. 3 is an explanatory view showing one example of a form image.

FIG. 3 is an explanatory view showing one example of a form image. As shown in FIG. 3, the layout of form image elements, for example, a character frame 182a, a character 182b, a reference mark 182c, a barcode 182d is set. It is to be noted that the reference marks 182c provide references for the direction and layout position of the form 154 when the OCR device 120 performs OCR processing on image data read by the scanner 140. Further, the barcode 182d is obtained by encoding arbitrary information in accordance with predetermined rules and denotes, for example, a form ID that identifies the form 154.

The form creation device 110 generates a form image such as shown in FIG. 3 in response to user's input through the operation unit 162. In this case, the form 154 includes a plurality of input regions 184 summarizing input aspects with regularities. The input region 184 is enclosed by, for example, the character frame 182a. The input region 184 is capable of setting in it the type of characters (alphabet, number, Japanese, symbol, etc.), the attributes (handwritten character, type, etc.), etc. assumed to be written.

The retaining unit 164 is constituted of a hard disk drive (HDD), a flash memory, a nonvolatile random access memory (RAM), etc. In the present embodiment, the retaining unit 164 is integrated with the form creation device 110 but not restricted to this aspect and may be, for example, a separate network attached storage (NAS) or an external HDD or universal serial bus (USB) memory, etc.

The retaining unit 164 retains the ranges of set information (for example, length and thickness of ruled lines) that prescribes image elements in a form image (for example, ruled lines) that is suitable for OCR processing and the patterns of the image elements to be a replacement candidates. The image element patterns will be described in detail later. The set information contains at least one of a character font, a character size, a paper sheet size, a ruled line length, a ruled line width, a ruled line direction, a size of a character frame 182a, a line width of the character frame 182a, a checkbox size, a checkbox spacing, a barcode type, a barcode size, a barcode element width, a barcode check digit, a color, a dropout color, a positioning mark size, a positioning mark disposition, a printout scale factor, and a post-printout image element size.

Of the set information, for example, the character font selection range covers the Ming style and the Gothic style and the character size range covers 10 to 14 points. The paper sheet size selection range covers up to an A4 size in the case of an ordinary form and up to B4 size in the case of a dropout color form. The ruled line length selection range covers 5 mm or more, the ruled line width selection range covers 0.2 mm or more, and the ruled line direction selection range covers vertical and horizontal directions. Further, the size of the character frame 182a is defined by a height and a width of the character frame 182 and has a selection range of a height of 10 mm or more and a width of 7 mm or more. The line width of the character frame 182 selection range covers 0.2 mm or more.

Of the set information, for example, the barcode type selection range covers NW-7, OODE39, OODE128, JAN13, etc. and the barcode size selection range covers a height of 10 mm or more and an overall width of 100 mm or less. Further, the barcode constituent bar or space width, that is, the element width selection range covers a minimum width of 0.2 mm (300/400 dpi), a minimum width of 0.3 mm (200/240 dpi), and a maximum width of 2.0 mm. The barcode check digit selection range covers NW-7 (Modulus 10/11/16) and OOE39 (Modulus 43).

Of the set information, for example, the color selection range covers dark-printing black etc. The dropout color selection range covers brilliant read-, green-, and blue-based colors, etc. Further, the printout scale factor selection range covers 90 to 110% etc.

Of the set information, the set information selection range of, for example, the character size and the ruled line width influenced by the printout scale factor may cover sizes in a case where the printout scale factor is 100% (post-printout image element sizes) or sizes after printing in the printout scale factor arbitrarily specified.

Further, the set information selection range denotes the lower limits of spacing between the adjacent image elements for each image element type or in accordance with the combinations of the adjacent image elements. Furthermore, by assuming the entire form image to be one image element, the retaining unit 164 may retain the described basic information selection range as the selection range of the set information of this image element.

Figure 4:
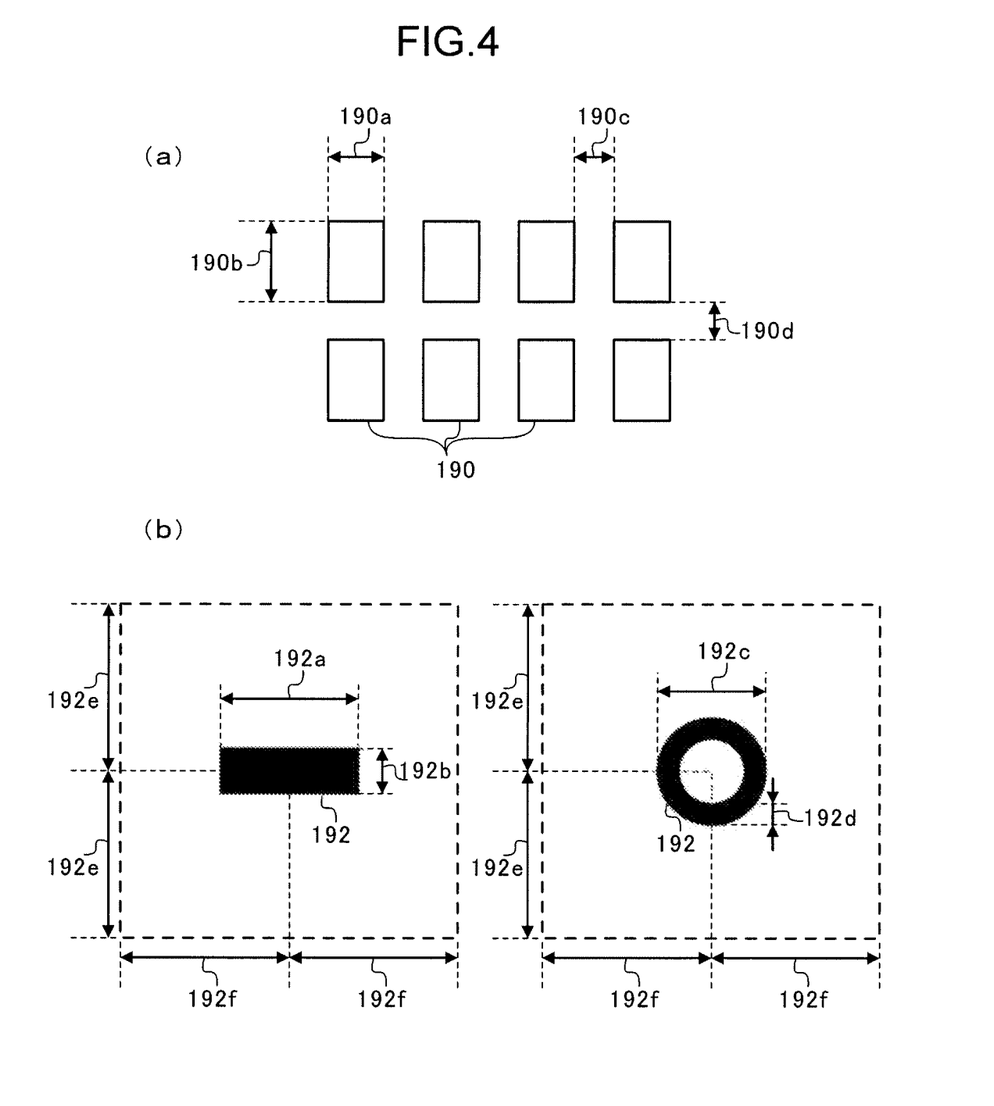
FIG. 4 is an explanatory view of set information.

FIG. 4 is an explanatory view of the set information. FIG. 4A is an explanatory view of the size and spacing of the checkboxes and FIG. 4B is an explanatory view of the size and disposition of the positioning marks 192.

As shown in FIG. 4A, among the set information of the image element checkbox 190, for example, the size of the check box 190 is denoted by width 190a and height 190b of the checkbox 190 and the spacing thereof is denoted by horizontal spacing 190c and vertical spacing 190d between the adjacent checkboxes 190. The set information selection range covers 4 mm or more as each of the width 190a and the height 190b and 2 mm or more as each of the horizontal spacing 190c and the vertical spacing 190d.

Further, as shown in FIG. 4B, among the set information of the image element positioning mark 192, for example, the size of the positioning mark 192 is denoted by, for example, width 192a and the height 192b if the positioning mark 192 is rectangular and, for example, diameter 192c and line width 192d if the positioning mark 192 is doughnut-shaped and the disposition of the positioning mark 192 is denoted by, for example, position coordinates of the center of the positioning mark 192. The set information selection range covers 4.5 to 5.5 mm as the width 192a, 2.5 to 3.5 mm as the height 192b, 4.5 to 5.5 mm as the diameter 192c, and 1.0 to 1.5 mm as the line width 192d. Further, if the set information is the position coordinates of the center of the positioning mark 192, the set information selection range covers 1.0 mm or more as each of distances 192e and 192f between the vertical ends and between the horizontal ends of the form image respectively.

About such set information, the retaining unit 164 retains its range that is suitable for OCR processing in it. As described above, the form creation device 110 in the present embodiment can set image element set information up to a lot of detailed items and also improve the accuracy in OCR processing by generating a form image as reference with the set information range retained in the retaining unit 164.

The central control unit 166 controls the entire form creation device 110 by using a semiconductor integrated circuit incorporating a central processing unit (CPU), an ROM storing a program etc., and an RAM serving as a working area, etc. Further, the central control unit 166 functions also as an image generation unit 170, a suitability decision unit 172, an element replacement unit 174, a data output unit 176, an output control unit 178, and a definition output unit 180.

The image generation unit 170 generates a form image based on a user's input through the operation unit 162 and a set information range retained in the retaining unit 164. For example, if having received a user's input for the generation of a form image in the aforesaid OCR form mode, the image generation unit 170 sets an initial value of the set information of image elements of the form image within a set information range retained in the retaining unit 164.

If having received a user's input that instructs the disposition of image elements, for example, a ruled line, a character frame 182a, and a character 182b, the image generation unit 170 sets and disposes initial values of set information of those image elements, for example, a line width of the ruled line and a size of the character 182b based on a set information range retained in the retaining unit 164. Such a configuration enables, from the beginning, disposing image elements whose initial values suitable for OCR processing are set as set information, thereby improving working efficiency.

In this case, in response to a user's input, the image generation unit 170 sets the setting information initial value to a recommended value that is suitable for OCR processing more than those in the set information range retained in the retaining unit 164 or to a limit value that is suitable for the OCR processing less than those in the set information range. If the recommended value is used, the OCR processing accuracy is improved more, and if the limit value is used, for example, the character size or the image element spacing can be made relatively small, so that the degree of freedom of the form layout can be increased. Further, the initial values can be changed by the user's input. The initial values changed by the user's input can be initialized to the pre-change initial values.

The set information range in the retaining unit 164 is retained for each, for example, model name of the OCR device 120 or name and version of OCR processing software used in the OCR processing unit in the OCR device 120, so that the image generation unit 170 may be configured to use a set information range that corresponds to a user's input or control information from the OCR device 120.

Further, for example, if the ordinary mode is switched to the OCR form mode or if a user's input is given for selection of the OCR form mode, the suitability decision unit 172 decides whether or not each of the image elements of an already generated form image is suitable for OCR processing. The suitable decision unit 172 decides whether or not the element is suitable for the OCR processing based on, for example, a set information range retained in the retaining unit 164 or its combination with any other image elements.

Figure 5:
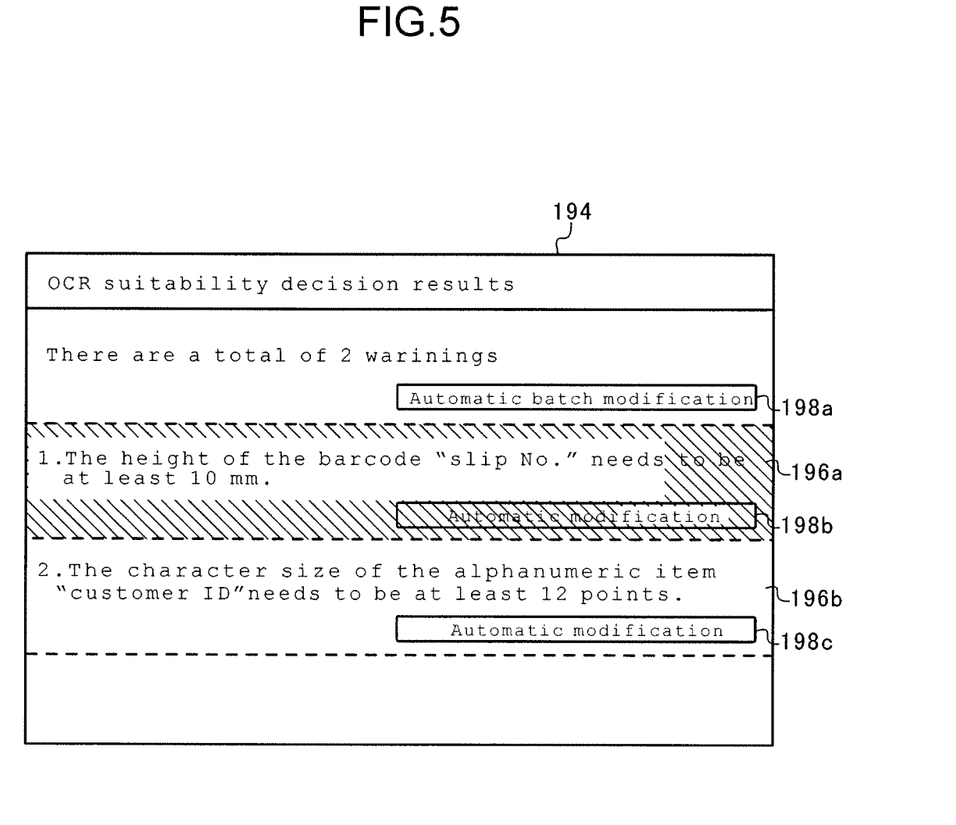
FIG. 5 is an explanatory view of decision processing in a suitability decision unit.

FIG. 5 is an explanatory view of decision processing in the suitability decision unit 172. If the suitability decision unit 172 decides whether or not each of the image elements of a form image is suitable for OCR processing, the display unit 160 is caused to display a decision result screen 194 to notify the user as shown in FIG. 5. For example, in a region 196a, the display unit 160 displays that the height of the barcode "slip No." (image element) falls outside the range of the set information retained in the retaining unit 164 and is not suitable for the OCR processing and a lower limit value of the range. Further, in a region 196b, it displays that the character size of the alphanumeric item "customer ID" falls outside the range of the set information retained in the retaining unit 164 and is not suitable for the OCR processing and a lower limit value of the range.

Further, if the region 196a is selected by a user's input as shown by a hatching in FIG. 5, for example, the corresponding image element in the form images displayed side by side on the display unit 160, that is, the barcode "slip No." itself is highlighted. Therefore, the user can easily know the image element that is not suitable for the OCR processing.

In such a manner, the configuration of referencing the range of image element set information retained in the retaining unit 164 enables to decide whether or not the image element setting is suitable for the OCR processing only by comparing this setting to this range. Further, the retaining unit 164 may separately retain the set information range for the purpose of setting initial values of the set information of image elements to be newly generated and the set information range for the purpose of deciding whether or not the already generated image element is suitable for the OCR processing. Furthermore, in response to a user's input, the suitability decision unit 172 makes the criteria severe by using the aforesaid initial value's recommended value or moderate by using the initial value's limit value.

By including the suitability decision unit 172, even in a case where, for example, the set information of already created image elements is outside the set information range retained in the retaining unit 164 so that the accuracy in OCR processing may be insufficient, by notifying the user of the image elements whose set information is decided as being outside the set information range retained in the retaining unit 164, the user can be prompted to modify the set information.

Further, the suitability decision unit 172 decides whether or not only a user-specified or range-specified one of the form image-constituent image elements or its set information or set information specified for all of the image elements is suitable for the OCR processing.

Such a configuration enables to avoid uselessly performing decision processing on image elements whose suitability decision for the OCR processing is unnecessary, such as those with sufficient accuracy in OCR processing and those intentionally excluded from the OCR processing owing to a drop-out color etc. Thus, This configuration enables to reduce processing loads and to shorten processing time. Further, if there is set information desired for decision with especially severe criteria, the user can select the set information alone and makes the criteria severer and then decide whether or not it is suitable for the OCR processing.

The element replacement unit 174 replaces a form image-constituent element that is not suitable for the OCR processing with the image element that is suitable for it.

As shown in FIG. 5, a button 198a denoting as "Automatic batch modification" is displayed at the upper part on the decision result screen 194, and, for example, buttons 198b and 198c denoting as "Automatic modification" are displayed in regions 196a and 196b, respectively. If the user selects the button 198a through the operation unit 162, the set information of the image elements denoted in all of the regions 196a and 196b are rewritten with values in the respectively corresponding ranges. Further, if the user selects the buttons 198b and 198c, it is possible to automatically modify the set information of the image elements individually. Furthermore, besides automatic modification, the user can enter an arbitrary value as the set information for modification.

Such a configuration makes it possible to automatically replace an image element that is not suitable for the OCR processing with an image element that is suitable for it. Therefore, the user can be relieved of heavy work burdens of modifying the image element set information to be suitable for the OCR processing.

Further, the element replacement unit 174 performs pattern matching on form image-constituent elements and a pattern retained in the retaining unit 164 and replaces the image elements corresponding to the pattern with those suitable for the OCR processing.

Figure 6:
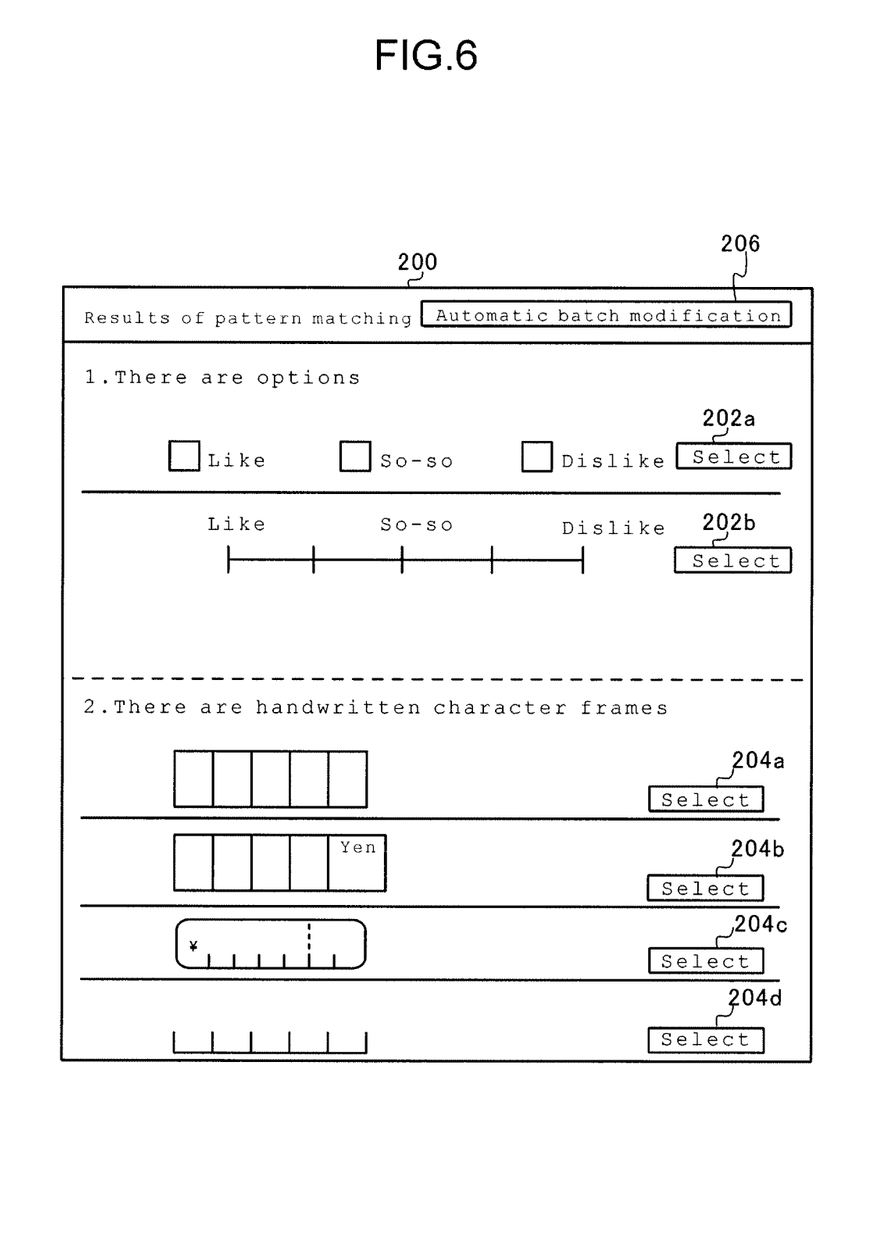
FIG. 6 is an explanatory view of replacement processing based on pattern matching in an element replacement unit.

FIG. 6 is an explanatory view of replacement processing based on pattern matching in the element replacement unit 174. If there are any image elements in an input format that is not suitable for the OCR processing, for example, such a format that the user would encircle characters "Like", "So-so", and "Dislike" or such image elements that the user would write a plurality of characters (for example, numeral having a plurality of digits) into one character frame in a predetermined format, replacement candidates for the replacement-recommended image elements are displayed on a pattern replacement screen 200 as shown in FIG. 6.

Similar to the decision result screen 194 described in FIG. 5, on the pattern replacement screen 200, image elements themselves in a form image displayed side by side on the display unit 160 that correspond to an image element selected through a user's input will be highlighted.

If any one of buttons 202a to 202b and 204a to 204d is selected through a user's input, the element replacement unit 174 replaces it with an image element additionally provided with a checkbox provided to the side of each of the characters corresponding to the selected one of the buttons 202a-202b and 204a-204d, for example, "Like", "So-so", and "Dislike", an auxiliary line that divides a character frame by the number of the characters, etc. Further, if an "Automatic batch modification" button 206 is selected, the replacement unit 174 automatically selects and introduces image elements in an input format that is most suitable for the OCR processing in a predetermined priority with the image elements in the input format that is not suitable for the OCR processing.

By such a configuration, even if the user does not know the input format that is suitable for the OCR processing, the element replacement unit 174 can notify the user of the image elements in the input format that is not suitable for the OCR processing and indicate the replacement candidates. Thus, an input format suitable for the OCR processing may be selected through a user's input, thereby improving the OCR processing accuracy.

The data output unit 176 converts the form image into a format that corresponds to printing and outputs it to the printer 130.

In printing of the form image, the output control unit 178 controls the printer 130 so that it may be printed out under predetermined printing conditions. Besides direct control on the printer 130, the output control unit 178 may provide the printer 130 with control information of printing conditions such as prohibition of alterations so that the printer 130 would set the printing conditions based on the control information.

Even in a case where a layout that enhances the OCR processing accuracy is set, if reduced printing, for example, is performed because the printing conditions are changed in the printer 130, the character size or the line thickness may be reduced in the printed form, deteriorating the OCR processing accuracy. Such a situation can be avoided by causing the output control unit 178 to control the printer 130 so that it may perform printing under the predetermined printing conditions.

The definition output unit 180 electronically provides the OCR device 120 with a form image generated by the image generation unit 170. Further, besides the case of outputting the form images, the definition output unit 180 may generate definition information that denotes definitions for use in OCR processing based on a form image and output it to the OCR device 120.

As described above, the form creation device 110 in the present embodiment enables free designing of forms in response to a user's input and also can generate a form image within a set information range retained in the retaining unit 164 in such a manner that the image element set information may be suitable for the OCR processing. Accordingly, the accuracy of the OCR processing on the form 154 can be improved.

(OCR Device 120)

Figure 7:
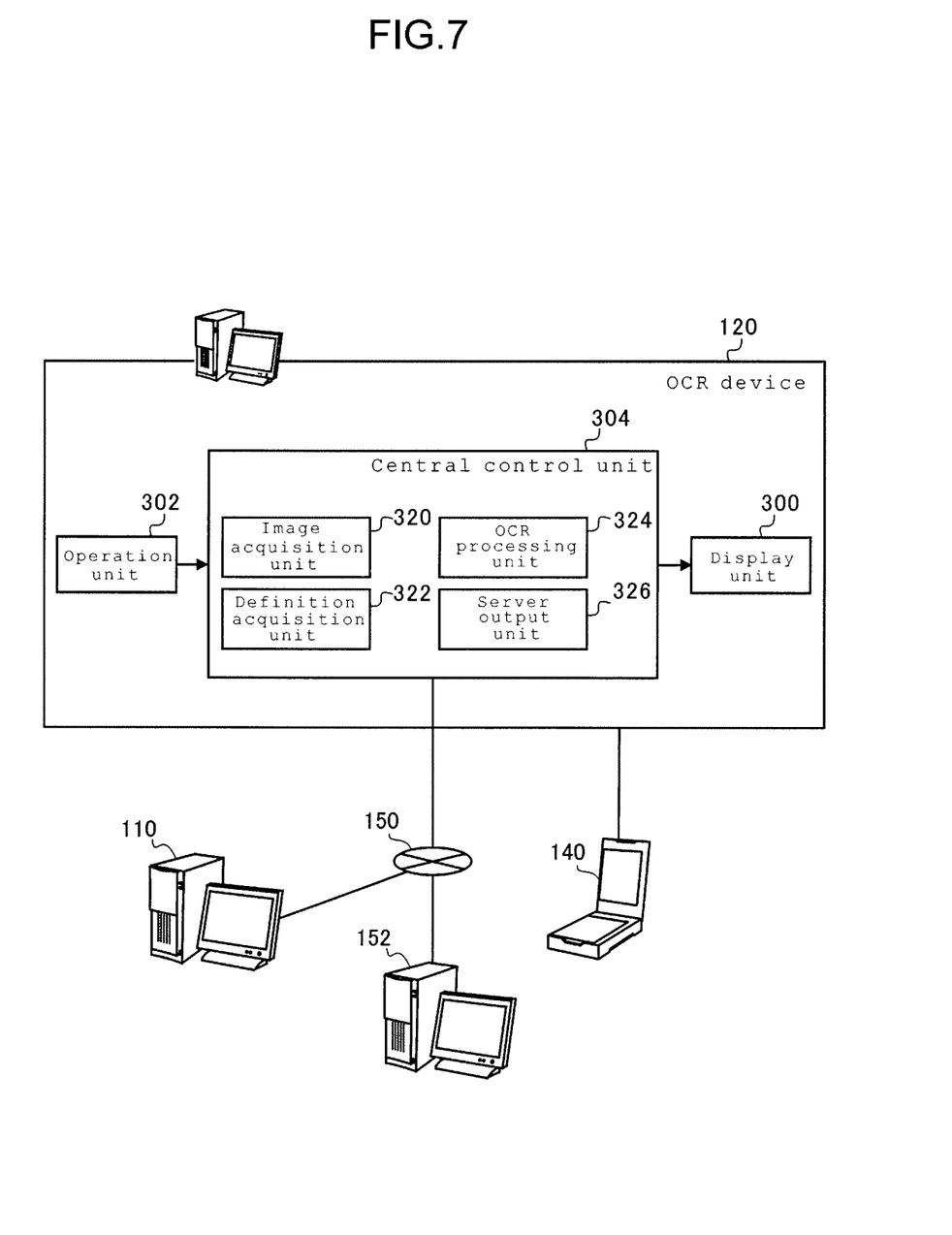
FIG. 7 is a functional block diagram showing a configuration of an OCR device.

FIG. 7 is a functional block diagram showing a configuration of the OCR device 120. The OCR device 120 includes a display unit 300, an operation unit 302, and a central control unit 304.

The display unit 300 is constituted of an LCD, an organic EL display, etc. The operation unit 302 is constituted of a touch panel, a keyboard mounted with a plurality of operation keys, a pointing device such as a mouse, an arrow key, or a joystick.

The central control unit 304 controls the entire OCR device 120 by using a semiconductor integrated circuit incorporating a central processing unit (CPU), an ROM storing a program etc., and an RAM serving as a working area, etc. Further, the central control unit 304 functions also as an image acquisition unit 320, a definition acquisition unit 322, an OCR processing unit 324, and a server output unit 326.

The image acquisition unit 320 acquires image data generated by reading the form 154 from the scanner 140.

The definition acquisition unit 322 acquires a form image or definition information output from the definition output unit 180 in the form creation device 110. If having acquired the form image, the definition acquisition unit 322 generates definition information that denotes definitions for use in OCR processing from that form image.

The OCR processing unit 324 performs OCR processing on image data of the form 154 read by the scanner 140 (processing to extract from this image data the contents of characters, numbers, etc. denoted by the image data) based on the definition information acquired or generated by the definition acquisition unit 322 by using as a reference the positions of the reference marks 182c in an image of the image data acquired by the image acquisition unit 320.

The server output unit 326 provides the application server 152 with the information of the characters and numbers extracted as a result of the OCR processing performed by the OCR processing unit 324.

The hereinabove described form creation device 110 and the OCR device 120 enable to improve the accuracy in OCR processing on a generated form 154 while securing the degree of freedom of the layout. Further, the present invention provides a form generation program that causes a computer to function as the form creation device 110 and a computer readable recording medium recording the form creation program such as a flexible disk, a magneto-optical disk, an ROM, an EPROM, an EEPROM, a compact disk (CD), a digital versatile disk (DVD), or a blue-ray disc (BD). Here, the program refers to data processing means described using an arbitrary language or description method.

Further, the form creation program may be stored in an arbitrary application program server connected to the form creation device 100 via the communication network 150 or can be downloaded entirely or partially as required.

(Form Creation Method)

Figure 8:
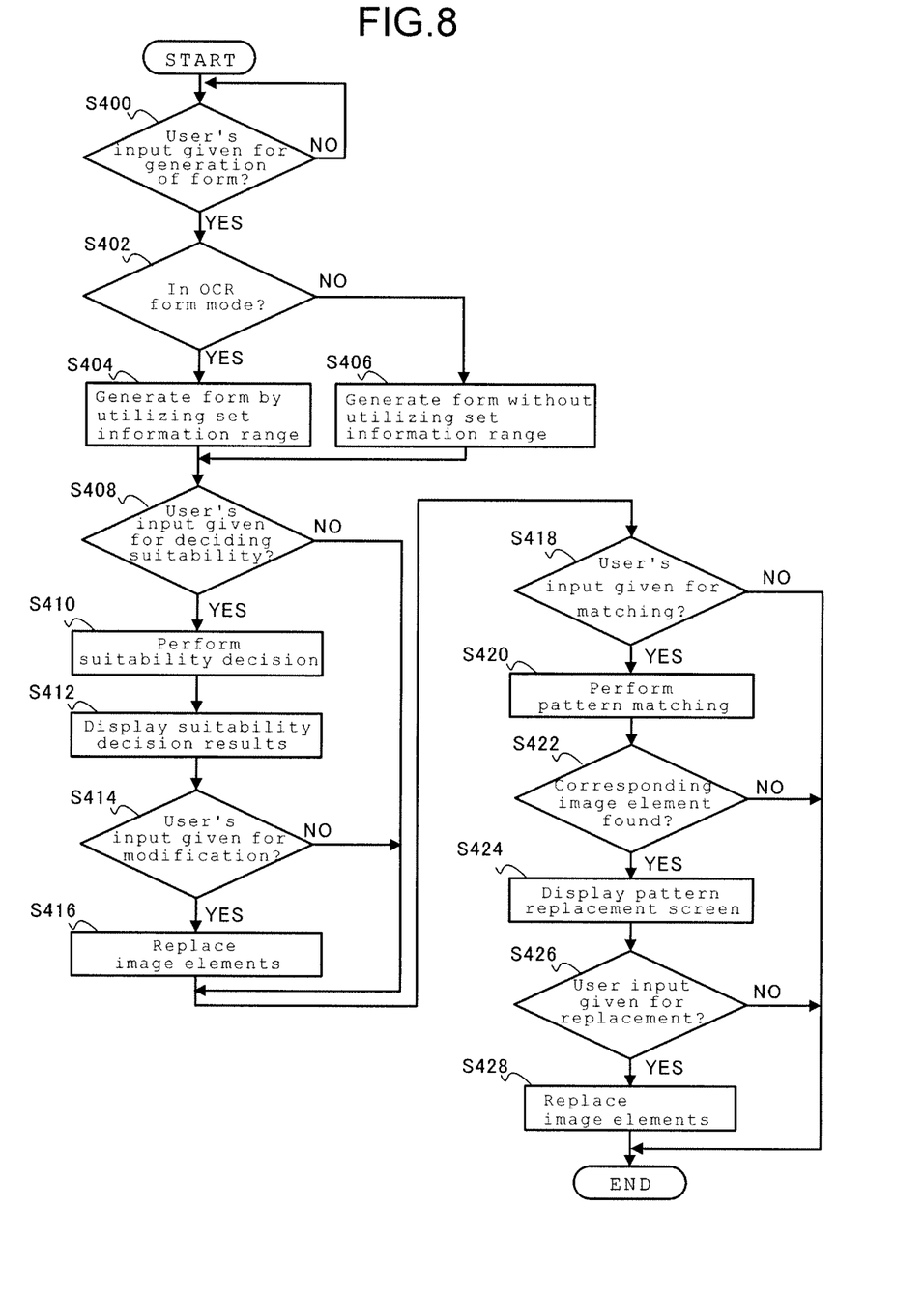
FIG. 8 is a flowchart showing a flow of overall processing of a form creation method.

Next, a description will be given of the form creation method that operates the aforesaid form processing system. FIG. 8 is a flowchart showing the flow of overall processing of the form creation method.

As shown in FIG. 8, if a user's input is given for instructing the generation of a form image (S400), the image generation unit 170 decides whether or not the current design mode is the OCR form mode (S402) and, if it is the OCR form mode (YES in S402), generates a form image based on the user's input through the operation unit 162 and a set information range for making suitable for the OCR processing retained in the retaining unit 164 (S404). If the current mode is the ordinary mode rather than the OCR form mode (NO in S402), the image generation unit 170 generates a form image only based on the user's input (S406).

Then, if a user's input is given for switching from the ordinary mode to the OCR form mode or for decision on suitability to the OCR processing (YES in S408), the suitability decision unit 172 decides whether each of the form image constituent image elements is suitable for the OCR processing or not (S410), and causes the display unit 160 to display the decision result screen on which the results of the decision are indicated (S412).

The element replacement unit 174 decides whether or not a user's input is given for instructing automatic or manual modification (S414) and, if the user's input instructs modification (YES in S414), replaces any of the form image constituent image elements that is not suitable for the OCR processing with the image element that is suitable for the OCR processing (S416).

After the image element replacement step S416 or in the user's input for suitability decision step S408, if a user' input is not given for switching from the ordinary mode to the OCR form mode or for decision on suitability to the OCR processing (NO in S408), the element replacement unit 174 decides whether or not a user's input is given that instructs patter matching (S418). If the user's input is given to instruct pattern matching (YES in S418), pattern matching is performed on image elements of the form image and patterns retained in the retaining unit 164 (S420), to decide whether there are the corresponding image elements or not (S422). If there is the corresponding image element (YES in S422), the element replacement unit 174 causes the display unit 160 to display the pattern replacement screen (S424).

The element replacement unit 174 decides whether a user's input is given for selecting replacement candidate and replacing (S426) and, if the user's input is given for selecting replacement candidate and replacing (YES in S426), replaces the image element in an input format that is not suitable for the OCR processing with the selected image element in an input format that is suitable for the OCR processing (S428).

In such a form creation method, it is possible to improve the accuracy in OCR processing on generated forms while securing the degree of freedom of the layout.

Although there has been hereinabove described the preferred embodiment of the present invention with reference to the accompanying drawings, of course, it should be appreciated that the present invention is not limited thereto. Accordingly, any and all modifications and variations which is conceivable to those skilled in the art should be considered to be within the scope of the present invention as defined in the appended claims.

It is to be noted that the steps in the form creation method in the present specification need not necessarily be performed in a time-series manner along the order described in the flowchart and may follow concurrent processing or subroutine-based processing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A form creation device comprising:
   an operation unit configured to receive a user's input for creation of a form layout;
   a retaining unit that retains a range of set information which prescribes image elements that are suitable for OCR processing;
   an image generation unit that generates a form image based on the user's input and the set information range retained in the retaining unit;
   a suitability decision unit that decides whether each of the image elements that constitutes the form image is suitable for the OCR processing; and
   an element replacement unit that replaces any ones of the image elements of the form image which are not suitable for the OCR processing with the image elements which are suitable for the OCR processing.

2. The form creation device according to claim 1, wherein the image generation unit sets an initial value of the set information of the image elements that constitutes the form image within the set information range retained in the retaining unit.

3. The form creation device according to claim 1, wherein the suitability decision unit decides whether or not only user-specified ones of the image elements that constitute the form image are suitable for the OCR processing.

4. The form creation device according to claim 1, wherein the suitability decision unit decides whether or not the image elements are suitable for the OCR processing based on the set information range retained in the retaining unit.

5. The form creation device according to claim 1, wherein the retaining unit retains a pattern of the image elements that provide a replacement candidate, and
   the element replacement unit performs pattern matching on the image elements of the form image and the pattern retained in the retaining unit and replaces the image element that corresponds to the pattern with the image element that is suitable for the OCR processing.

6. The form creation device according to claim 1, wherein the set information contains at least one of a character font, a character size, a paper sheet size, a ruled line length, a ruled line width, a ruled line direction, a character frame size, a character frame line width, a checkbox size, a checkbox spacing, a barcode type, a barcode size, a barcode element width, a barcode check digit, a color, a dropout color, a positioning mark size, a positioning mark disposition, a printout scale factor, and a post-printout image element size.

7. The form creation device according to claim 1, further comprising an output control unit that, in the case of printing the form image, controls an image output device so that printing is performed under predetermined printing conditions.

8. A method for creating form comprising:
   a receiving step of receiving a user's input for creation of a form layout;
   a generation step of generating a form image in accordance with the user's input;

a suitability decision step of deciding whether or not each of image elements that constitute the form image is suitable for OCR processing;

a display step of displaying results of the decision; and an element replacement step of replacing any ones of the image elements of the form image which are not suitable for the OCR processing with the image elements which are suitable for the OCR processing.

9. A non-transitory computer-readable medium storing thereon a computer program used in a computer, the computer program causing the computer to function as:

an operation unit configured to receive a user's input for creation of a form layout;

a retaining unit that retains a range of set information which prescribes image elements that are suitable for OCR processing;

an image generation unit that generates a form image based on the user's input and the set information range retained in the retaining unit;

a suitability decision unit that decides whether each of the image elements that constitutes the form image is suitable for the OCR processing; and an element replacement unit that replaces any ones of the image elements of the form image which are not suitable for the OCR processing with the image elements which are suitable for the OCR processing.

* * * * *